US006297320B1

(12) United States Patent
Tang et al.

(10) Patent No.: US 6,297,320 B1
(45) Date of Patent: Oct. 2, 2001

(54) CURABLE COMPOSITIONS COMPRISING ACETOACETOXY AND IMINE FUNCTIONALITY

(75) Inventors: Weilin Tang, Frankfort; Hong Ding, Naperville; Michael J. D'Errico, Chicago Heights; David P. Leonard, Lynwood, all of IL (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 09/438,821

(22) Filed: Nov. 11, 1999

Related U.S. Application Data

(60) Provisional application No. 60/109,326, filed on Nov. 20, 1998.

(51) Int. Cl.$^7$ .......................... C09D 133/14; C08L 33/14
(52) U.S. Cl. ..................... 525/107; 525/111; 525/113; 525/153; 525/154; 525/155; 525/157; 525/159; 525/330.5; 525/342; 525/374; 525/379
(58) Field of Search ...................... 525/107, 111, 525/113, 153, 154, 155, 157, 159, 330.5, 342, 374, 379

(56) References Cited

U.S. PATENT DOCUMENTS

| 3,668,183 | 6/1972 | Hoy et al. ............................... 260/65 |
| 4,929,661 | 5/1990 | Noomen et al. ........................ 524/259 |
| 5,098,984 | 3/1992 | Mafoti ..................................... 528/73 |
| 5,221,581 | 6/1993 | Palmer et al. ...................... 428/425.8 |
| 5,242,978 | 9/1993 | Schafer et al. ......................... 525/102 |
| 5,288,802 | 2/1994 | Walters et al. ......................... 525/110 |
| 5,288,804 | 2/1994 | Kim et al. ............................... 525/154 |
| 5,290,848 | 3/1994 | Palmer et al. ......................... 524/517 |
| 5,296,530 | 3/1994 | Bors et al. ............................. 524/558 |
| 5,324,446 | 6/1994 | Madaj ............................... 252/183.11 |
| 5,380,784 | 1/1995 | Usuki et al. ........................... 524/407 |
| 5,426,148 | 6/1995 | Tucker ................................... 524/496 |
| 5,453,464 | 9/1995 | Witzeman et al. .................... 525/153 |
| 5,462,992 | 10/1995 | Wilt et al. .............................. 525/176 |
| 5,494,961 | 2/1996 | Lavoie et al. ......................... 525/102 |
| 5,494,975 | 2/1996 | Lavoie et al. ....................... 525/928.6 |
| 5,525,662 | 6/1996 | Lavoie et al. ......................... 524/558 |
| 5,536,784 | 7/1996 | Mao et al. ............................. 525/154 |
| 5,545,824 | 8/1996 | Stengel et al. ........................ 524/590 |
| 5,548,024 | 8/1996 | Lavoie et al. ......................... 525/102 |
| 5,567,761 | 10/1996 | Song ..................................... 524/523 |
| 5,677,379 * | 10/1997 | Becker et al. ........................ 525/101 |
| 5,714,563 | 2/1998 | DePompei et al. ..................... 528/59 |
| 5,952,407 | 9/1999 | Rasoul et al. ......................... 524/108 |
| 5,952,443 | 9/1999 | Wilt et al. ............................... 528/26 |
| 5,990,243 | 11/1999 | Mormile et al. ...................... 525/111 |

FOREIGN PATENT DOCUMENTS

| 2164994 | 6/1996 | (CA) | ............................... C08L/33/14 |
| 0199087 | 10/1986 | (EP) | ................................. C08F/8/32 |
| 0417824 A1 | 3/1991 | (EP) | .............................. C08G/18/83 |
| 0508981 B1 | 10/1992 | (EP) | .............................. C08L/67/07 |
| 0603716 A1 | 6/1994 | (EP) | ................................. C09K/3/10 |
| 0651023 A2 | 5/1995 | (EP) | ............................ C08L/101/00 |
| 0737725 A1 | 10/1996 | (EP) | ................................. C09D/4/00 |
| 0737726 A1 | 10/1996 | (EP) | ................................. C09D/4/06 |
| 0744450 A2 | 11/1996 | (EP) | ............................ C09D/133/14 |
| A-1 009473 | 11/1965 | (GB) . | |
| WO 91/09910 | 11/1991 | (WO) | .............................. C08L/67/07 |
| WO 95/09208 | 6/1995 | (WO) | ............................ C09D/133/08 |
| WO 96/37562 | 11/1996 | (WO) | ................................. C09D/5/00 |
| WO 96/37563 | 11/1996 | (WO) | ................................. C09D/5/00 |

OTHER PUBLICATIONS

F. Del Hector, W. W. Blount, and D. R. Leonard; "Applications for Acetoacetyl Chemistry in Thermoset Coatings"; Journal of Coatings Technology—vol. 61, No. //Apr. 1, 1989; pp. 31–37.

AkzoNobel Resins; Setal 26–2016; 10.97.01; Datasheet.

Akzo Nobel Resins; "Technical Bulletin: 3.5 VOC High Solids NISO Ketac primer system"; 10.97.01; pp. 1–8.

Cardolite Corporation; "Cardolite NC–559 Phenalkamine Curing Agent for Water–Borne Coatings"; Jun. 1996; 2 pages.

Dialog Alert DA001; Record—22; 1 page (1996).

Abstract, JP–A–55–94 904 (Nippon Synthetic Chemical Industry Co., Ltd.) Jul. 18, 1980.

\* cited by examiner

*Primary Examiner*—Donald R. Wilson
(74) *Attorney, Agent, or Firm*—Robert E. McDonald; Paul R. Katterle; Vivien Y. Tsang

(57) ABSTRACT

A multi-component curable composition which is reactive upon admixing of the components and which comprises:

(i) an acrylic polymer having acetoacetoxy functionality; and (ii) an acetoacetoxy functional derivative of a low molecular weight polyol; and (iii) a crosslinking component comprising at least one imine functional compound having an average of at least two imine groups per molecule which are reactive with acetoacetoxy functionality.

36 Claims, No Drawings

CURABLE COMPOSITIONS COMPRISING ACETOACETOXY AND IMINE FUNCTIONALITY

This application claims benefit of Prov. No. 60/109,326 filed Nov. 20, 1998.

BACKGROUND OF THE INVENTION

1. Field of the Invention

This invention relates to a multi-component curable composition which is reactive upon admixing of the components and which comprises:

(i) an acrylic polymer having acetoacetoxy functionality; and (ii) an acetoacetoxy functional derivative of a low molecular weight polyol; and (iii) a crosslinking component comprising at least one imine functional compound having an average of at least two imine groups per molecule which are reactive with acetoacetoxy functionality; and (iv) optionally, a polyamine having an average of at least two primary amine groups per molecule.

The curable compositions of this invention are especially useful as coatings, particularly primers. The reactive coatings of this invention can be cured at room temperature or force dried at temperatures ranging up to about 350° F. The combination of acetoacetoxy functional materials and imine functional materials provide fast reacting, durable coatings having excellent adhesion.

2. Description of the Prior Art

The use of acetoacetoxy functional materials in Michael-type reactions is known in the art. For example, U.S. Pat. No. 3,668,183 teaches the reaction of polyacetoacetates and polyimines. European Patent Application 744,450 teaches reactive compositions of acetoacetates and multi-functional amines.

The prior art has not, however, taught the combination of an acetoacetoxy functional acrylic polymer and an acetoacetoxy functional derivative of a low molecular weight polyol, and an imine functional material and, optionally, a polyamine to provide low temperature curing coatings having excellent durability, adhesion and performance.

A BRIEF SUMMARY OF THE INVENTION

This invention involves a multi-component curable composition which comprises:

(a) a first component comprising:
  (i) an acrylic polymer having acetoacetoxy functionality; and
  (ii) an acetoacetoxy functional derivative of a low molecular weight polyol; and
(b) a crosslinking component comprising at least one imine functional compound.

In one preferred formulation, the curable composition also comprises an amine functional compound having an average of at least two primary amine groups per molecule. Additionally, in some applications, it may be preferable to incorporate within the curable composition an organosilane material for enhanced performance and adhesion properties.

It is especially preferred to utilize the curable composition of this invention in combination with about 5 to about 80%, and especially 5 to about 50% by weight of an inert solvent, such as esters, ketones, aromatic and aliphatic hydrocarbons, etc. It is convenient to provide the coating composition as a multi-component system which is reactive upon mixing of the components. Especially preferred is a two-package system wherein the acetoacetoxy functional materials are combined in one package and the imine compound and, optionally, the amine compound are provided in a second package. The two packages can be mixed together to provide the curable coatings immediately prior to application.

Accordingly, it is an object of this invention to provide improved curable compositions having excellent reactivity at low temperatures. It is a further object of this invention to provide coating compositions which may be utilized as primers, topcoats, or other coating compositions. Another object of this invention is to provide an improved two-package coating composition wherein one package comprises acetoacetoxy functional materials and the other package comprises imine functional materials and, optionally, amine functional materials. A further object of this invention is to provide improved coating compositions which can be cured at room temperature or forced dried at elevated temperatures. These and other objects of the invention will become apparent from the following discussions.

DETAILED DESCRIPTION OF THE INVENTION

1. Acrylic Polymers Having Acetoacetoxy Functionality

The acetoacetoxy functional acrylic polymers useful in this invention are those having an average of at least two pendant acetoacetoxy groups per molecule. The polymers can be conveniently prepared by addition polymerization of one or more unsaturated monomers. One practical approach to preparing these polymers involves the polymerization of acetoacetate functional unsaturated monomers, typically along with one or more other unsaturated copolymerizable monomers. One especially preferred acetoacetate functional monomer due to its reactivity and commercial availability, is acetoacetoxyethylmethacrylate. Other unsaturated monomers that are useful for introducing acetoacetate functional groups include acetoacetoxyethylmethacrylate, acetoacetoxy propylmethacrylate, allylacetoacetate, acetoacetoxybutylmethacrylate, 2,3-di(acetoacetoxy) propylmethacrylate, etc. In general, it is practical to convert polymerizable hydroxy functional monomers into acetoacetates by direct reaction with diketene or other suitable acetoacetyl converting agent. See, for example, *Journal of Coating Technology*, vol. 62, p. 101 (1990) "Comparison of Methods for the Preparation of the Acetoacetylated Coating Resins".

Alternatively, a hydroxy-functional polymer can be prepared by the free radical polymerization of hydroxy-functional unsaturated monomers and the resultant hydroxy-functional polymer can be converted to acetoacetoxy functional groups by direct reaction with diketene, by transesterification with suitable alkyl acetoacetates such as t-butylacetoacetate, or with the thermal reaction of 2,2,6-trimethyl-4H-1,3-dioxin-4-one.

The acetoacetoxy functional monomer will be present at a level of at least one percent by weight of the entire monomer mixture for the acrylic polymer, and typically will comprise from 10 to about 75 %, and preferably 25 to about 50% of the entire monomer mixture. Typically the acetoacetoxy functional monomers would be copolymerized with one or more monomers having ethylenic unsaturation such as:

(i) esters of acrylic, methacrylic, crotonic, tiglic, or other unsaturated acids such as: methyl acrylate, ethyl acrylate, propyl acrylate, isopropyl acrylate, butyl acrylate, isobutyl acrylate, ethylhexyl acrylate, amyl acrylate, 3,5,5-trimethylhexyl acrylate, methyl methacrylate, ethyl methacrylate, propyl methacrylate, isobornyl methacrylate, dimethylaminoethyl methacrylate, ethyl tiglate, methyl crotonate, ethyl crotonate, etc.;

(ii) vinyl compounds such as vinyl acetate, vinyl propionate, vinyl butyrate, vinyl isobutyrate, vinyl benzoate, vinyl m-chlorobenzoate, vinyl p-methoxybenzoate, vinyl alpha-chloroacetate, vinyl toluene, vinyl chloride, etc.;

(iii) styrene-based materials such as styrene, alpha-methyl styrene, alpha-ethyl styrene, alpha-bromo styrene, 2,6-dichlorostyrene, etc.;

(iv) allyl compounds such as allyl chloride, allyl acetate, allyl benzoate, allyl methacrylate, etc.;

(v) other copolymerizable unsaturated monomers such as acrylic acid, methacrylic acid, 2-hydroxy ethyl acrylate, acrylonitrile, methacrylonitrile, dimethyl maleate, isopropenyl acetate, isopropenyl isobutyrate, acrylamide, methacrylamide, and dienes such as 1,3-butadiene, etc.

The polymers are conveniently prepared by conventional free radical addition polymerization techniques. Frequently, the polymerization will be initiated by conventional initiators known in the art to generate a free radical such as azobis(isobutyronitrile), cumene hydroxperoxide, t-butyl perbenzoate, t-butyl peroctoate, t-amyl peroctoate, di-t-butyl peroxide, etc. Typically, the monomers are heated in the presence of the initiator and an inert solvent at temperatures ranging from about 35° C. to about 200° C. and especially 75° C. to 150° C., to effect the polymerization. The molecular weight of the polymer can be controlled, if desired, by the monomer and initiator selection, rate of addition, reaction temperature and time, and/or the use of chain transfer agents as is well known in the art. The number average molecular weight of the acetoacetoxy functional acrylic polymer will typically be at least 1,000 as determined by GPC. Typically, in those applications in which a relatively low viscosity is preferred, such as for spray applications at relatively low VOC levels, the number average molecular weight of the acetoacetoxy functional acrylic polymer preferably will be less than about 10,000, and the weight average molecular weight preferably will be less than about 20,000.

If the acetoacetoxy functional polymer is to be prepared by conversion of a hydroxy-functional polymer by the methods discussed above, then the hydroxy-functional monomer should be present at essentially the same levels preferred for the acetoacetoxy functional monomer.

2. Acetoacetoxy Functional Derivative of Polyols

In addition to the acetoacetoxy functional acrylic polymer, it is especially preferred in the practice of this invention to include an acetoacetoxy functional derivative of a low molecular weight polyol, especially a monomeric polyol. As used herein, the term "acetoacetoxy functional derivatives of polyols" means acetoacetoxy functional compounds generally obtained by the chemical conversion of at least some of the hydroxyl groups of the polyol to an acetoacetoxy group or to a group containing one or more acetoacetoxy groups. These acetoacetoxy functional derivatives of low molecular weight polyols help provide additional crosslinking sites and reduce the overall viscosity of the final curable composition. The polyol starting material should have an average of at least two hydroxy-functional groups per molecule and should have a number average molecular weight less than about 1000 and preferably less than about 500. Preferred polyols are the aliphatic, polyether, polyester and polyurethane polyols, especially diols and triols. Suitable polyols, for example, include diols such as ethylene glycol, dipropylene glycol, 2,2,4-trimethyl 1,3-pentanediol, neopentyl glycol, 1,2-propanediol, 1,4-butanediol, 1,3-butanediol, 2,3-butanediol, 1,5-pentanediol, 1,6-hexanediol, 2,2-dimethyl-1,3-propanediol, 1,4-cyclohexanedimethanol, 1,2-cyclohexanedimethanol, 1,3-cyclohexanedimethanol, 1,4-bis(2-hydroxyethoxy) cyclohexane, trimethylene glycol, tetramethylene glycol, pentamethylene glycol, hexamethylene glycol, decamethylene glycol, diethylene glycol, triethylene glycol, tetraethylene glycol, norbornylene glycol, 1,4-benzenedimethanol, 1,4-benzenediethanol, 2,4-dimethyl-2-ethylenehexane-1,3-diol, 2-butene-1,4-diol, and polyols such as trimethyolethane, trimethylolpropane, trimethylolhexane, triethylolpropane, 1,2,4-butanetriol, glycerol, pentaerythritol, dipentaerythritol, polycaprolactone polyols, etc. The acetoacetylation to convert the hydroxyl groups of the polyols to the corresponding acetoacetoxy functional derivatives can be conveniently accomplished by transesterification with a suitable acetoacetoxy ester, by direct reaction with diketene, or any other method known in the art. The acetoacetoxy functional derivative should have an average of at least about 1.01 acetoacetate groups per molecule and, preferably, at least about 2.0 acetoacetoxy groups per molecule.

It is especially preferred that the mixture of acetoacetoxy functional acrylic polymer and acetoacetoxy functional polyol derivative be such that at least 1%, and preferably 10 to about 80% of the total acetoacetoxy equivalents be obtained from the low molecular weight polyol derivative.

3. Imine Compounds

The imine compounds which are useful in the present invention may be generally represented by the formula:

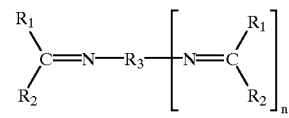

wherein n is 1 to 30, and preferably n is 1 to 5; $R_1$ and $R_2$ are hydrogen, an alkyl, aryl, cycloaliphatic, or substituted alkyl, aryl, or cycloaliphatic group; and $R_1$ and $R_2$ may be the same or different; and $R_3$ is an aliphatic, aromatic, arylaliphatic or cycloaliphatic group which may also contain heteroatoms such as O, N, S, or Si.

These imine compounds are typically prepared by the reaction of certain carbonyl compounds such as aldehydes and ketones with amines. Representative carbonyl compounds which may be used to form the imine include ketones such as acetone, methyl ethyl ketone, methyl isopropyl ketone, methyl isobutyl ketone, diethyl ketone, benzyl methylketone, diisopropyl ketone, cyclopentanone, and cyclohexanone, and aldehydes such as acetaldehyde, formaldehyde, propionaldehyde, isobutyraldehyde, n-butyraldehyde, heptaldehyde and cyclohexyl aldehydes. Representative amines which may be used to form the imine include ethylene diamine, ethylene triamine, propylene diamine, tetramethylene diamine, 1,6-hexamethylene diamine, bis(6-aminohexyl)ether, tricyclodecane diamine, N,N'-dimethyldiethyltriamine, cyclohexyl-1,2,4-triamine, cyclohexyl-1,2,4,5-tetraamine, 3,4,5-triaminopyran, 3,4-diaminofuran, and cycloaliphatic diamines such as those having the following structures:

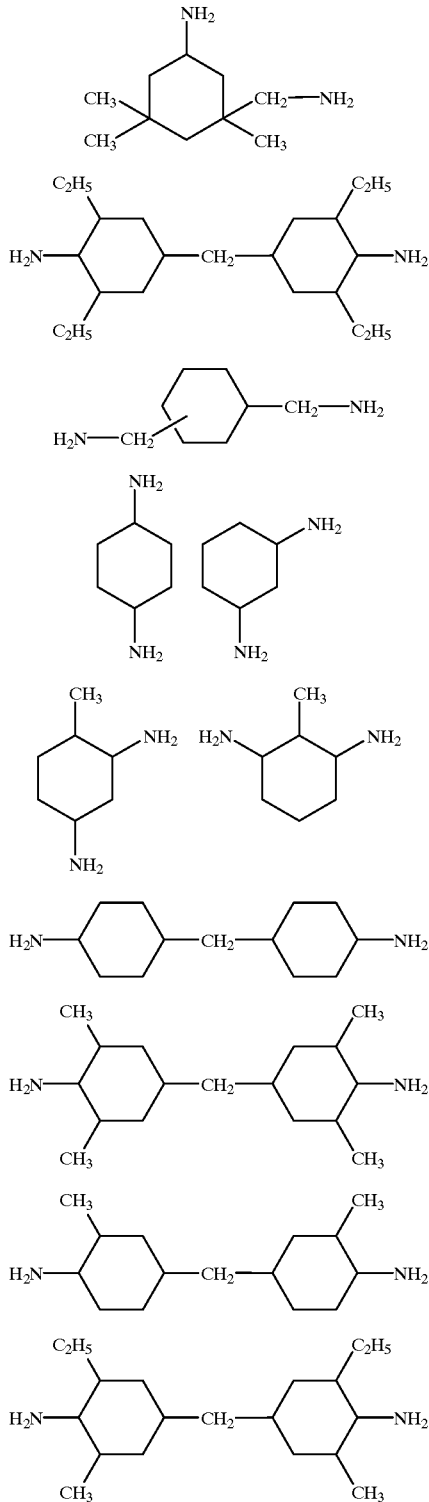

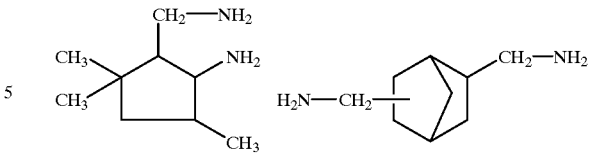

The imines are conveniently prepared by reacting a stoichiometric excess of the ketone or aldehyde with the polyamine in an azeotropic solvent and removing water as it is formed. In order to minimize side reactions, and to avoid delays due to prolonged processing, it is frequently desirable to avoid the prolonged heating necessary to remove all of the excess ketone or aldehyde and unreacted starting materials, provided that their presence does not adversely affect the performance of the final product.

One preferred type of imine compound for reaction with acetoacetoxy functional materials in the practice of this invention is an adduct obtained by reacting an imine having an additional reactive group other than an imine, such as a hydroxyl group or, preferably, an amine group with a compound, such as an isocyanate, or an epoxide, having one or more chemical groups or sites capable of reaction with the additional reactive group. For example, an imine obtained from the reaction of two moles of an aldehyde or ketone with a triamine having two primary and one secondary amine groups, such as diethylene triamine, will have an unreacted secondary amine group which could be subsequently reacted with a mono and/or polyepoxide, or a mono or polyisocyanate to produce the imine functional adduct. One especially preferred commercial imine having an additional reactive group is Shell Epicure 3501 which is the reaction product of diethylene triamine and methyl isobutyl ketone.

Polyisocyanates useful for reaction with the hydroxyl or amine group of the imine in the preferred configuration have an average of at least two isocyanate groups per molecule. Representative polyisocyanates useful for the preparation of this adduct include the aliphatic compounds such as ethylene, trimethylene, tetramethylene, pentamethylene, hexamethylene, 1,2-propylene, 1,2-butylene, 2,3-butylene, 1,3-butylene, ethylidene and 1,2-butylidene diisocyanates; the cycloalkylene compounds such as 3-isocyanatomethyl-3,5,5-trimethylcyclohexylisocyanate, and the 1,3-cyclopentane, 1,3-cyclohexane, and 1,2-cyclohexane diisocyanates; the aromatic compounds such as m-phenylene, p-phenylene, 4,4-diphenyl, 1,5-naphthalene and 1,4-naphthalene diisocyanates; the aliphatic-aromatic compounds such as 4,4-diphenylene methane, 2,4- or 2,6-toluene or mixtures thereof, 4,4'-toluidine, and 1,4-xylylene diisocyanates; the nuclear substituted aromatic compounds such as dianisdine diisocyanate, 4,4'-diphenylether diisocyanate and chlorodiphenylene diisocyanate; the triisocyanates such as triphenyl methane-4,4',4"-triisocyanate toluene; and the tetraisocyanates such as 4,4'-diphenyl-dimethyl methane -2,2',5,5'-tetraisocyanate; the polymerized polyisocyanates such as dimers and trimers, and other various polyisocyanates containing biuret, urethane, and/or allophanate linkages. Preferred polyisocyanates include dimers and trimers of hexamethylene diisocyanate and mixtures thereof.

For reaction with the imines having unreacted amine groups, representative useful monoepoxides include the monoglycidyl ethers of aliphatic or aromatic alcohols such as butyl glycidyl ether, octyl glycidyl ether, nonyl glycidyl ether, decyl glydicyl ether, dodecyl glycidyl ether, p-tertbutylphenyl glycidyl ether, o-cresyl glycidyl ether, and 3-glycidoxypropyl trimethoxysilane. Monoepoxy esters such as the glycidyl ester of versatic acid (commercially available as CARDURA® E from Shell Chemical Company or as Glydexx N-10 from Exxon Chemical Company), or the glycidyl esters of other acids such as tertiary-nonanoic acid, tertiary-decanoic acid, tertiary-undecanoic acid, etc. are also useful. Similarly, if desired, unsaturated monoepoxy esters such as glycidyl acrylate, glycidyl methacrylate or glycidyl laurate could be used. Additionally, monoepoxidized oils can also be used.

Other useful monoepoxies include styrene oxide, cyclohexene oxide, 1,2-butene oxide, 2,3-butene oxide, 1,2-pentene oxide, 1,2-heptene oxide, 1,2-octene oxide, 1,2-nonene oxide, 1,2-decene oxide, and the like.

Especially preferred as the poly-functional epoxy compounds, due to their reactivity and durability, are the polyepoxy-functional novalac, bisphenol and cycloalphatic epoxies. Preferably, the polyepoxies will have a number average molecular weight less than about 2,000 to minimize the viscosity of the adduct. It is particularly preferred for some applications to utilize a combination of both an imine adduct prepared by reaction of an imine having a secondary amine group and a polyepoxide and an imine adduct obtained by reaction of an imine having a secondary amine group and a monoepoxide.

4. Amine Functional Compounds

It is frequently preferred in the practice of this invention to include an amine functional compound in combination with the acetoacetoxy functional and imine functional materials. Amine groups are known to react with acetoacetoxy functional groups, and the presence of amine functional compounds having an average of at least two primary amine groups per molecule can enhance the curable compositions of this invention. Polyamines can be prepared by methods well known in the art such as by the free radical polymerization of acrylic or other unsaturated monomers having primary amine functionality, or by the reaction of amines having at least two primary amine groups per molecule with a polycarboxylic acid to form polyamide amines. The polyamines can be polymeric, typically having a number average molecular weight over 800, or lower molecular weight materials, such as tetraethylenepentamine, 1,3-diaminopropane, 1,6-diaminohexane, etc.

The primary polyamines listed in Section 3 of this disclosure are also useful in the practice of this invention. Other useful amines include tricyclodecanedimethaneamine and the polyprimary amine functional phenols such as Cardolite NC559 from Cardolite, Inc. Typically, the amine will be present at a level to provide up to 70% of the total equivalents of amine and imine desired for reaction with the total acetoacetoxy functionality.

The ratios of acetoacetoxy groups to other functional groups in the curable compositions can be widely varied within the practice of this invention. It is only necessary to combine the acetoacetoxy functional and other reactive materials in amounts sufficient to provide the desired degree of crosslinking upon cure. It is generally preferred, however, to utilize a slight excess of imine and amine equivalents and generally the equivalent ratio of imine and amine, if any, to total acetoacetoxy equivalents is at least 1.01 to 1. Small amounts (e.g. typically less than 10% by weight of the total resin solids) of other materials reactive with amines, such as epoxies, and especially polyepoxies, such as the bisphenol, novalac, or cycloaliphatic polyepoxies, can also be utilized in the curable compositions. The curable compositions of this invention can be cured at temperatures ranging from about room temperature up to about 350° F. When the curable compositions are utilized as coatings, the coatings can be clear coatings or they may contain pigments as is well known in the art. Representative opacifying pigments include white pigments such as titanium dioxide, zinc oxide, antimony oxide, etc. and organic or inorganic chromatic pigments such as iron oxide, carbon black, phthalocyanine blue, etc. The coatings may also contain extender pigments such as calcium carbonate, clay, silica, barytes, talc, etc.

The coatings may also contain other additives such as flow agents, catalysts, diluents, solvents, ultraviolet light absorbers, flexibilizers (such as thermoplastic acrylic polymers, etc.), adhesion promoters, etc. Especially preferred as adhesion promoters are organosilanes, and especially amine silanes or epoxy silanes. Representative organosilanes are taught in *Silane Coupling Agents* by E. P. Pluddemann (Plenum Press, New York, 1982). Specific useful silanes include 3-mercaptopropyltrimethoxysilane, 3-aminopropyltrimethoxysilane and 3-glycidoxylpropyltrimethoxysilane. Typically, the organosilane will be present at a level of at least 0.01% by weight of the total resin solids and preferably 0.1 to about 5%.

It is especially preferred in the curable compositions of this invention to include a catalyst for the reaction of acetoacetoxy groups and imine and amine groups. Representative catalysts include acids such as benzoic acid and isostearic acid. The catalyst will typically be present at a level of at least 0.01% by weight of the reactants.

Since the curable compositions of this invention are typically provided as multi-package systems which must be mixed together prior to use, the pigments, catalysts and other additives can be conveniently added to any or all of the appropriate individual packages. Due to the potential for hydrolysis of the reactive groups, it is especially preferred for most applications that the curable compositions of this invention would be non-aqueous systems.

The curable compositions of this invention may typically be applied to any substrate such as metal, plastic, wood, glass, synthetic fibers, etc. by brushing, dipping, roll coating, flow coating, spraying, in-mold coating or other method conventionally employed in the coating industry.

The following examples have been selected to illustrate specific embodiments and practices of advantage to a more complete understanding of the invention. Unless otherwise stated, "parts" means parts-by-weight and "percent" is percent-by-weight, equivalent weight is on a weight solids basis, and molecular weight was determined by GPC relative to polystyrene standards.

Acetoacetoxy Functional Acrylic Resins

The acetoacetoxy functional resins can be representatively prepared by a process of (i) charging a reaction vessel with a suitable solvent and heating to an appropriate reaction temperature; (ii) adding to the heated solvent a mixture of solvent and initiator and monomers over a period of about three hours; (iii) holding the mixture at the reaction temperature; (iv) chasing the reaction mixture with solvent and initiator and maintaining the reaction temperature until the polymerization or reaction is sufficiently complete.

EXAMPLE A1 n-Butylacetate (590.0 parts) was charged into a four-necked reactor equipped with an overhead stirrer, temperature controller, condenser, initiator and monomer feeding tubes and nitrogen blanket. After the solvent was heated to 115° C., a homogenous mixture of n-butylacetate (250.0 parts) and VAZO 67 (172.5 parts), and a mixture of 2-(acetoacetoxy)ethyl methacrylate (1000.0 parts), methyl methacrylate (500.0 parts), n-butylacrylate (500.0 parts), styrene (500.0 parts) and 2-mercaptoethanol (47.5 parts) were gradually fed into the reactor over 3 h at 115° C. The reaction solution was then held for 1 h at 115° C. A mixture of n-butylacetate (10.0 parts) and VAZO 67 (7.5 parts) was fed into the reactor over 20 min and the solution was held for another 1 h before cooled and discharged. The resultant resin had an NVM of 72.9%, a weight per gallon of 8.91, a color of 1, a Gardener-Holdt viscosity of V+, a number average molecular weight of 2052, and a weight average molecular weight of 3540.

EXAMPLES A2–A11

In like manner to Example A1, additional representative acetoacetoxy functional polymers were prepared as shown in the following table:

ally fed into the reactor over 3.5 h at 115° C. Simultaneously, a mixture of 2-(acetoacetoxy)ethyl methacrylate (1048.6 parts), n-butylmethacrylate (256.2 parts), isobornyl methacrylate (505.8 parts), 2-ethylhexyl acrylate (485.5 parts), styrene (211.8 parts) and 2-mercaptoethanol (55.0 parts) was also gradually fed into the reactor over 3 h at 115° C. The reaction solution was then held for 2 h at 115° C. before cooling. Then n-butylacetate (73.2 parts) was charged as wash solvent into the reactor.

Acetoacetoxy Functional Polyol Derivatives

EXAMPLE B1

A mixture of t-butylacetoacetate (2185.2 parts) and 1,6-hexanediol (814.8 parts) was charged into a four-necked reactor equipped with an overhead stirrer, temperature controller, distillation head, condenser, receiver and nitrogen blanket. The solution was heated to 115° C., and t-BuOH generated from the reaction was distilled off from the solution (reduced pressure may be applied to further remove t-BuOH and keep the temperature below 130° C.). After the

TABLE 1

AcAc Functional Acrylics

| | Examples | | | | | | | | | |
|---|---|---|---|---|---|---|---|---|---|---|
| | A2 | A3 | A4 | A5 | A6 | A7 | A8 | A9 | A10[1] | A11 |
| n-Butyl acetate (n-BuAc) | 820.0 | 825.0 | 825.0 | 825.0 | 500.0 | 864.0 | | | | |
| Methyl amyl ketone (MAK) | | | | | | | 500.0 | | 500.0 | |
| Methyl isobutyl ketone (MIBK) | | | | | | | | 500.0 | | 500.0 |
| VAZO 67 | 142.5 | 156.4 | 162.5 | 170.0 | 75.0 | 138.5 | | | | |
| t-Butyl peroctoate (t-BPO) | | | | | | | 96.0 | 95.6 | 95.6 | 96 |
| 2-methylethanol (2-ME) | | 40.0 | 41.0 | 43.0 | 20.0 | 36.0 | 15.0 | 15.0 | 22.5 | 16 |
| Acetoacetoxyethyl methacrylate (AAEM) | 1000 | 1000 | 1000 | 1000 | 642.0 | 1050.0 | 450 | 450 | 450 | 803 |
| Styrene (St) | 500 | 250 | 250 | 250 | 120.0 | 205.0 | 225 | 225 | 225 | 150 |
| Methyl methacrylate (MMA) | 600 | 850 | 850 | 850 | | | | 225 | | |
| Methacrylic acid (MAA) | | | | | | | | | 100 | |
| Glycidyl neodecanoate (Glydexx N-10) | | | | | | | | | 275 | |
| n-Butyl acrylate (n-BA) | 400 | | 200 | 400 | | | | | | |
| n-Butyl methacrylate (n-BMA) | | | | | 150.0 | 255.0 | 525 | 300 | 150 | 248 |
| Isobornyl methacrylate (IBoMA) | | | | | 300.0 | 505.0 | 300 | 300 | 300 | 300 |
| 2-ethylhexyl acrylate (2-EHA) | | 400 | 200 | | 288.0 | 485.0 | | | | |
| NVM % | 72.5 | 72.8 | 73.5 | 73.8 | 72.1 | 72.5 | 73.0 | 73.2 | 70.4 | 73.1 |
| WPG (lb/gal) | 9.01 | 8.92 | 9.00 | 9.00 | 8.72 | 8.69 | 8.47 | 8.60 | 8.52 | 8.66 |
| Color | 1 | <1 | 1 | 1 | 1 | 1 | 1 | 1 | 1 | 1 |
| G-H Viscosity (25° C.) | Z6– | Z3 | Z2– | Z2+ | | V | | | | |
| Mn | 4583 | 2592 | | | | 2523 | | | | |
| Mw | 9529 | 4396 | | | | 4023 | | | | |
| Pd | 2.1 | 1.7 | | | | 1.6 | | | | |

[1]In Example A10, the glycidyl neodecanoate is added with the unsaturated monomers and presumed to react with the acid functionality of the methacrylic acid.

EXAMPLE A12 n-Butylacetate (731.0 parts) was charged into a four-necked reactor equipped with an overhead stirrer, temperature controller, condenser, initiator and monomer feeding tubes and nitrogen blanket. After the solvent was heated to 115° C., a homogenous initiator mixture of n-butylacetate (35.0 parts) and t-amylperoctoate (174.0 parts) was gradutheoretical amount of t-BuOH was collected, the solution was cooled and discharged.

EXAMPLES B2–B10

In like manner to Example B1, additional representative acetoacetoxy functional polyol derivatives were prepared as shown in the following table (in parts by weight):

TABLE 2

AcAc Functional Polyol Derivatives

| | Examples | | | | | | | | |
|---|---|---|---|---|---|---|---|---|---|
| | B2 | B3 | B4 | B5 | B6 | B7 | B8 | B9 | B10 |
| t-Butylacetoacetate (t-BuAcAc) | 78.0 | 97.8 | 82.3 | 83.8 | 75.1 | 68.4 | 66.4 | 80.63 | 77.9 |
| Trimethylopropane (TMP) | 22.0 | | | | | | | | |
| Trimethyloethane (TME) | | 20.2 | | | | | | | |
| Pentaerythritol (PE) | | | 17.7 | | | | | | |
| Glycerin (Gly) | | | | 16.2 | | | | | |
| Neopentyl glycol (NPG) | | | | | 24.9 | | | | |
| 2,2,4-Trimethyl-1,3-pentanediol (TMPD) | | | | | | 31.6 | | | |
| 2,2-Butylethyl-1,3-pentanediol (BEPD) | | | | | | | 33.6 | | |
| 1,2-Propanediol (1,2-PG) | | | | | | | | 19.4 | |
| 1,4-Butanediol (1,4-BG) | | | | | | | | | 22.1 |
| AcAc EQ | 129 | 124 | 118 | 115 | 137 | 157 | 164 | 140 | 147 |
| LB/Gallon | 9.80 | 9.75 | 10.28 | 10.17 | 9.18 | 8.63 | 8.61 | 9.04 | 9.17 |
| Viscosity | F | C | T | C | A1 | A1 | A3 | A1 | A1 |

Imine Compounds

EXAMPLE C1

A mixture of tricyclodecanedimethaneamine (300.0 parts) and methylisobutylketone (MIBK) (407.0 parts) was charged into a four-necked reactor equipped with an overhead stirrer, temperature controller, distillation head, condenser and nitrogen blanket. The solution was heated at reflux temperature (100–132° C.) for 5 hours. Water generated from the reaction (53.7 parts) was collected from the water trap. The solution was then cooled and discharged.

EXAMPLE C2

A mixture of the p-aminobenzoic ester of PTHF commercially available as Versalink P250 (288.5 parts), isobutyraldehyde (88.4 parts) and toluene (123.1 parts) was charged into a four-necked reactor equipped with an overhead stirrer, temperature controller, distillation head, water trap, condenser and nitrogen blanket. The solution was heated at reflux temperature (116–150° C.) for 5 hours. Water generated from the reaction (19 parts) was collected from the water trap. The solution was then cooled and discharged.

EXAMPLE C3

A mixture of the secondary amine functional ketimine prepared by the reaction of diethylene triamine and methyl isobutyl ketone, commercially available as EPICURE 3501 (900.0 parts), EPON 826 (646.0 parts) and methylisobutylketone (MIBK) (580.0 parts) was charged into a four-necked reactor equipped with an overhead stirrer, temperature controller, distillation head, condenser and nitrogen blanket. The mixture was heated to 120–130° C. and held for 2 h before cooled and discharged.

EXAMPLE C4

Isophorone diisocyanate (63.9 parts) was charged into a four-necked reactor equipped with an overhead stirrer, temperature controller, feed inlet, condenser and nitrogen blanket. After the reactor was heated to 50° C., a mixture of Tone 0200 polycaprolactone polyol (76.1 parts), dibutyltin dilaurate (0.06 parts) and n-butyl acetate (60.0 parts) was gradually fed into the reactor at 50° C. over 2 hours. The solution was heated to 70° C. and held for 2 hours before cooled. This product was described as "Solution I". Another reactor equipped with an overhead stirrer, temperature controller, water trap, condenser and nitrogen blanket was charged with bishexamethylenetriamine (62.0 parts), isobutyraldehyde (41.6 parts) and toluene (95.6 parts). The solution was heated at reflux temperature (up to 125° C.) for 3 hours. Water generated from the reaction (10.4 parts) was collected from the water trap. The solution was then cooled to room temperature. "Solution I" was added and mixed with this solution which then exothermed to 60° C. The reaction mixture was then heated to 75° C. and held for 1 hour before cooled and discharged.

EXAMPLE C5

(Ketimine/Epoxy Adduct)

A mixture of 571.9 parts of the reaction product of diethylene triamine and methyl isobutyl ketone (obtained by a processing variation in the commercial product EPICURE 3501 to provide a product which contained 10% MIBK, 85% ketimine and about 5% impurities and unreacted starting materials), Epalloy 8240 (a novalac-type epoxy commercially available from CVC Specialty Chemicals) (256.0 parts), Cardura E-10 (80.0 parts) and methylisobutylketone (MIBK) (93.0 parts), was charged into a four-necked reactor equipped with an overhead stirrer, temperature controller, condenser and nitrogen blanket. The mixture was heated to 120–125° C. and held for 2 h before cooled and discharged.

EXAMPLES C6–C11

In like manner to the foregoing examples, the following representative imines were prepared:

TABLE 3

Imines

| | C6 | C7 | C8 | C9 | C10 | C11 |
|---|---|---|---|---|---|---|
| MIBK | 262.6 | 551.9 | 658.4 | 481.6 | 672.8 | 33.8 |
| Jeffamine D400[1] | 237.4 | | | | | |
| EPICURE 3501[2] | | 900.0 | 900.0 | 765.0 | 765.0 | 53.4 |
| EPALLOY 8240[3] | | 607.1 | | | | |
| Glydexx N-10[4] | | | 778.1 | | | |
| Araldite DY 025[5] | | | | 900.0 | | |
| Carolite NC-513[6] | | | | | 1525.9 | |
| Silquest A-187[7] | | | | | | 48.0 |
| NVM % (as ketimine, calc.) | 70.0 | 76.2 | 75.5 | 80.0 | 79.1 | 75.0 |
| WPG (lb/gal) | 7.38 | 7.95 | 7.48 | 7.35 | 7.68 | |
| Color | <1 | | | 7 | 12 | |
| G-H Viscosity (25%) | A | | | A3 | A1-A | |
| Primary Amine EQ (solid, calc.) | 282 | 219 | 257 | 283 | 386 | |
| Mn | | 824 | | | | |
| Mw | | 945 | | | | |
| Pd | | 1.2 | | | | |

[1] polyethylene oxide diamine
[2] diethylenetriamine/MIBK ketimine
[3] novalak-type epoxy
[4] glycidyl neodecanoate
[5] alkyl (C12–C24) glycidyl ether
[6] n-alkyl (C15H27)-phenol glycidyl ether
[7] 3-glycidoxypropyl trimethoxysilane A variety of curable compositions were prepared as follows and applied by spray application to cold rolled steel substrates. Unless otherwise indicated, viscosity is measured using a #2 Zahn cup under ASTM 4212-93, tack free time is determined according to ASTM D1640 with a 50 g weight at 75° F. and 50% relative humidity, salt fog testing was conducted under ASTM B117 for 500 hours, wet adhesion testing was conducted according to ASTM 1735-92, and both wet and dry adhesion were measured according to ASTM 3359-95a.

TABLE 4

| Examples | D1 | D2 | D3 |
|---|---|---|---|
| | Parts by Weight | | |
| Package 1: | | | |
| Resin From Example A6 | 57.74 | 57.74 | 45.52 |
| Resin From Example B2 | | | 5.57 |
| 3-Glycidoxypropyltrimethoxysilane | | 1.90 | 1.95 |
| n-Butylacetate | 35.00 | 36.00 | 34.00 |
| Package 2: | | | |
| Resin From Example C3 | 26.8 | 26.8 | 35.55 |
| VOC, lb./gal. | 3.8 | 3.8 | 3.6 |
| Viscosity, second (#2 Zahn Cup) | 16.6 | 16.4 | 16.4 |
| Tack Free Time, minutes | 40 | 40 | 39 |
| Koenig Pendulum Hardness (KPH) | 68 | 63 | 81 |
| Dry Adhesion to Cold Rolled Steel | 0B | 5B | 5B |

As demonstrated by examples D1, D2 and D3, the addition of the silane improves adhesion and the addition of the AcAc functional polyol B2 can minimize VOC without adversely affecting viscosity, adhesion or tack free time.

TABLE 5

| | D4 | D5 | D6 | D7 | D8 |
|---|---|---|---|---|---|
| | Parts by Weight | | | | |
| Package 1: | | | | | |
| Resin From Example A8 | 100.00 | 100.00 | 100.00 | 75.02 | 50.01 |
| Resin From Example B2 | 0.0 | 0.00 | 0.00 | 5.02 | 10.02 |
| n-Butylacetate | 55.00 | 53.50 | 52.00 | 50.60 | 46.50 |
| Package 2: | | | | | |
| Resin From Example C7 | 17.17 | 30.06 | 42.91 | 17.18 | 17.18 |
| Resin From Example C8 | 28.34 | 14.17 | 0.00 | 28.34 | 28.34 |
| VOC, lb./gal. | 3.5 | 3.5 | 3.5 | 3.5 | 3.5 |
| Viscosity, second (#2 Zahn Cup) | 16.88 | 18.06 | 19.28 | 15.89 | 14.65 |
| Tack Free Time, minutes | 28 | 25 | 21 | 28 | 28 |
| KPH Hardness | 78 | 91 | 96 | 64 | 64 |

As demonstrated in Examples D4–D8, the addition of the AcAc functional polyol B2, and the combination of imines C7 and C8 can reduce viscosity of the coatings while still providing acceptable performance.

A grind paste was prepared by mixing the following materials:

TABLE 6

| Example D9 Ingredients | Parts by Weight |
|---|---|
| Resin From Example C7 | 170.20 |
| Resin From Example C8 | 55.09 |
| Cardolite NC-559 Crosslinker | 20.14 |
| Disperbyk 115 | 29.66 |
| n-Butylacetate | 230.05 |
| Propylane Glycol Methyl Ether Acetate | 153.36 |
| Barium Sulfate | 253.50 |
| Titanium Dioxide | 138.13 |
| Zinc Phosphate | 218.38 |
| Talc[1] | 301.84 |

TABLE 6-continued

| Example D9 Ingredients | Parts by Weight |
| --- | --- |
| Kaolin Clay[2] | 74.29 |
| Carbon Black | 2.59 |
| Total | 1647.25 |

[1]Talc is commercially available from Specialty Minerals, Inc. as Talc Micronized Flaky
[2]Kaolin Clay is from Burgess Pigment Co. as Kaolin Clay #60

A clear coating solution was prepared by mixing the following ingredients:

TABLE 7

| Example D10 Coating Composition | Parts by Weight |
| --- | --- |
| Resin From Example A7 | 318.50 |
| Resin From Example B2 | 40.20 |
| 3-Glycidoxypropyltrimethoxysilane | 8.33 |
| Methyl Isobutyl Ketone | 23.83 |
| Acetone | 70.94 |
| n-Butylacetate | 33.02 |
| Isostearic acid | 0.94 |
| Total | 495.21 |

A pigmented coating was prepared as shown below:

TABLE 8

| Example D11 Coating Composition | Parts by Weight |
| --- | --- |
| Package 1: | |
| Grind Paste From Example D9 | 250.0 |
| Package 2: | |
| Resin Solution From Example D10 | 83.13 |
| Total | 333.13 |
| Viscosity, second (#2 Zahn Cup) | 19 |
| Potlife, hours | 2 |
| Tack Free Time, minutes | 20 |
| Sandable at (hours) | 1 |
| Hardness (KPH) | 43 |
| Dry Adhesion to Cold Rolled Steel | 5B |
| Top Coat Adhesion | 5B |

Additional pigmented coatings were prepared and tested as shown below:

TABLE 9

| | Examples | | | | | | |
| --- | --- | --- | --- | --- | --- | --- | --- |
| | D12 | D13 | D14 | D15 | D16 | D17 | D18 |
| | Parts by Weight | | | | | | |
| Package 1: | | | | | | | |
| Grind Paste From Example D9 | 250.00 | 250.00 | 250.00 | 250.00 | 250.00 | 250.00 | 250.0 |
| Package 2: | | | | | | | |
| Resin Solution from Example D10, but teplacing equivalent B2 with | 82.89 B3 | 82.61 B4 | 82.47 B5 | 83.46 B6 | 84.46 B7 | 82.80 B8 | 83.13 B9 |
| Viscosity, second (#2 Zahn Cup) | 20.70 | 21.42 | 22.77 | 18.97 | 20.08 | 18.74 | 19.15 |
| Tack Free Time, minutes | 40 | 35 | 24 | 90 | 45 | 40 | 40 |
| KPH Hardness | 43 | 49 | 60 | 20 | 39 | 34 | 31 |
| Dry Adhesion to Cold Rolled Steel | 5B | 5B | 5B | 5B | 5B | 5B | 5B |

Combinations of the curable compositions of this invention along with a polyepoxide are demonstrated in the Examples below:

TABLE 10

| Example D19 Ingredients | Parts by Weight |
| --- | --- |
| Resin From Example C7 | 112.37 |
| Cardolite NC-559 Crosslinker | 40.54 |
| ANTI-TERRA U Anti-settling agent[1] | 10.25 |
| n-Butylacetate | 60.00 |
| Methyl Isobutyl Ketone | 108.00 |
| PG Monomethyl Ether Acetate | 48.00 |
| Aromatic Naphtha 100 Flash | 24.00 |
| Barium Sulfate | 139.83 |
| Titanium Dioxide | 76.19 |
| Zinc Phosphate | 87.59 |
| Talc[2] | 166.48 |
| Kaolin Clay[3] | 40.98 |
| Carbon Black | 1.43 |
| Total | 915.66 |

[1]Commercially available from Byk-Chemie
[2]Talc is commercially available from Specialty Minerals, Inc. as Talc Micronized Flaky
[3]Kaolin Clay is from Burgess Pigment Co. as Kaolin Clay #60

TABLE 11

| Examples | D20 | D21 |
| --- | --- | --- |
| | Parts by Weight | |
| Package 1: | | |
| Grind Paste from Example D19 | 118.67 | 112.06 |
| Package 2: | | |
| Resin From Example A7 | 28.36 | 26.78 |
| Resin From Example B2 | 3.79 | 3.58 |
| EPON 826 | | 2.21 |
| 3-Glycidoxypropyltrimethoxysilane | 0.54 | 0.51 |
| Methyl Isobutyl Ketone | 1.96 | 2.61 |
| Acetone | 5.83 | 7.77 |
| n-Butylacetate | 2.15 | 2.87 |
| Isostearic acid | | |
| Viscosity, second (#2 Zahn Cup) | 21.68 | 18.4 |
| Tack Free Time, minutes | 30 | 25 |
| KPH Hardness | 57 | 54 |
| Dry Adhesion to Cold Rolled Steel | 5B | 5B |
| Wet Adhesion | 2B | 5B |
| Salt Fog Spray | | |
| Rating | 2 | 5 |
| Adhesion | 0B | 5B |

The invention claimed is:

1. A multi-component curable composition which is reactive upon admixing of the components and which consisting essentially of:
   (i) an acrylic polymer having acetoacetoxy functionality; and
   (ii) an acetoacetoxy functional derivative of a low molecular weight polyol wherein the low molecular weight polyol has a number average molecular weight less than about 1000; and
   (iii) a crosslinking component comprising at least one imine functional compound having an average of at least two imine groups per molecule which are reactive with acetoacetoxy functionality.

2. The curable composition of claim 1 wherein the curable composition also comprises an amine functional compound having an average of at least two primary amine groups per molecule.

3. The composition of claim 1 wherein the imine functional compound is an adduct obtained by the reaction of:
   (i) an imine having at least one hydroxyl or amine group with
   (ii) one or more compounds having epoxy or isocyanate functionality which is reactive with the hydroxyl or amine group.

4. The composition of claim 1 wherein the composition also includes an organosilane.

5. The composition of claim 4 wherein the organosilane is an epoxy functional organosilane.

6. The composition of claim 4 wherein the organosilane is an amine functional organosilane.

7. The composition of claim 3 wherein the epoxy functional compound is selected from the group consisting of mono epoxies, novalac epoxies, cycloaliphatic epoxies, Bisphenol A epoxies, and mixtures thereof.

8. The composition of claim 3 wherein the imine crosslinker comprises the reaction products of an imine having at least one primary or secondary amine group with a monoepoxy.

9. The composition of claim 3 wherein the imine crosslinker comprises the reaction product of an imine having at least one primary or secondary amine group and a polyepoxide having an average of at least two epoxy groups per molecule.

10. The composition of claim 3 wherein the imine crosslinker comprises the reaction product of an imine having at least one primary or secondary amine group and a monoepoxide and the reaction product of an imine having at least one primary or secondary amine group and a polyepoxide having an average of at least two epoxy groups per molecule.

11. The reactive composition of claim 1 wherein the equivalent ratio of imine functionality to acetoacetoxy functionality is at least 1.01 to 1.0.

12. The reactive composition of claim 2 wherein the equivalent ratio of amine and imine functionality to acetoacetoxy functionality is at least 1.01 to 1.

13. The curable composition of claim 1 wherein the acrylic polymer is obtained by the polymerization of a monomer mixture comprising from 10 to about 75% by weight of an acetoacetoxy functional unsaturated monomer.

14. The curable composition of claim 13 wherein the acrylic polymer is obtained by the polymerization of a monomer mixture comprising from 25 to about 50% by weight of an acetoacetoxy functional unsaturated monomer.

15. The curable composition of claim 1 wherein the acrylic polymer having acetoacetoxy functionality is obtained by converting a hydroxy functional acrylic polymer to an acetoacetoxy functional polymer.

16. The curable composition of claim 1 wherein at least 1% of the total equivalents of acetoacetoxy functionality are provided by the acetoacetoxy functional polyol derivative.

17. The curable composition of claim 1 wherein 10 to 80% of the total equivalents of acetoacetoxy functionality are provided by the acetoacetoxy functional polyol derivative.

18. The curable composition of claim 1 wherein the low molecular weight polyol is selected from the group of aliphatic, polyester, polyether and polyurethane polyols.

19. The curable composition of claim 1 wherein the low molecular weight polyol has a number average molecular weight less than about 500.

20. The curable composition of claim 1 wherein the acrylic polymer having acetoacetoxy functionality has a number average molecular weight of at least 1,000.

21. The curable composition of claim 1 wherein the acrylic polymer having acetoacetoxy functionality has a number average molecular weight less than 20,000.

22. The curable composition of claim 1 wherein the acrylic polymer having acetoacetoxy functionality has a number average molecular weight less than 10,000.

23. The composition of claim 3 wherein the imine having at least one amine group is the reaction product of ethylene triamine and an aldehyde or ketone.

24. The composition of claim 1 wherein the composition also comprises a polyepoxide.

25. The composition of claim 2 wherein the composition also comprises a polyepoxide.

26. The composition of claim 1 wherein the composition is non-aqueous.

27. A multi-component curable composition which is reactive upon admixing of the components which consisting essentially of:
   (i) an acrylic polymer having acetoacetoxy functionality and a number average molecular weight of at least about 1,000; and
   (ii) an acetoacetoxy functional derivative of a low molecular weight polyol wherein the low molecular weight polyol has a number average molecular weight less than about 1,000; and
   (iii) at least one imine functional compound having an average of at least two imine groups per molecule which are reactive with acetoacetoxy functionality; and
   (iv) at least one amine functional compound having an average of at least two primary amine groups per molecule.

28. The composition of claim 27 wherein the low molecular weight polyol has a number average molecular weight less than 500.

29. The composition of claim 27 wherein the imine functional compound comprises the reaction product of:
   (i) an imine having at least two imine groups and at least one reactive group other than an imine; and
   (ii) a compound having one or more chemical groups capable of reaction with the reactive group.

30. The composition of claim 27 wherein the imine functional compound comprises the reaction product of an imine having at least one primary or secondary amine group and a monoepoxide and the reaction product of an imine having at least one primary or secondary amine group and a polyepoxide having an average of at least two epoxy groups per molecule.

31. A multi-component curable composition which is reactive upon admixing of the components which comprises:
   (i) at least one acetoacetoxy functional compound having an average of at least two acetoacetoxy groups per molecule; and
   (ii) an imine functional compound having an average of at least two imine groups per molecule and which comprises the reaction product of an imine having at least one primary or secondary amine group and a polyepoxide; and
   (iii) an imine functional compound having an average of at least two imine groups per molecule and which comprises the reaction product of an imine having at least one primary or secondary amine group and a monoepoxide.

32. The composition of claim 31 wherein the acetoacetoxy functional compound comprises an acrylic polymer having acetoacetoxy functionality.

33. The composition of claim 31 wherein the acetoacetoxy functional compound comprises an acetoacetoxy functional derivative of a low molecular weight polyol wherein the low molecular weight polyol has a number average molecular weight less than about 1000.

34. The composition of claim 31 wherein the composition also comprises an organosilane.

35. The composition of claim 31 wherein the composition also comprises an amine functional compound having an average of at least two primary amine groups per molecule.

36. The composition of claim 31 wherein the composition also comprises a polyepoxide.

* * * * *